April 26, 1960   F. O. WORDEN   2,934,229
SLED MOUNTED DISTRIBUTOR FOR HAY, STRAW AND THE LIKE
Filed March 31, 1958                           4 Sheets-Sheet 1
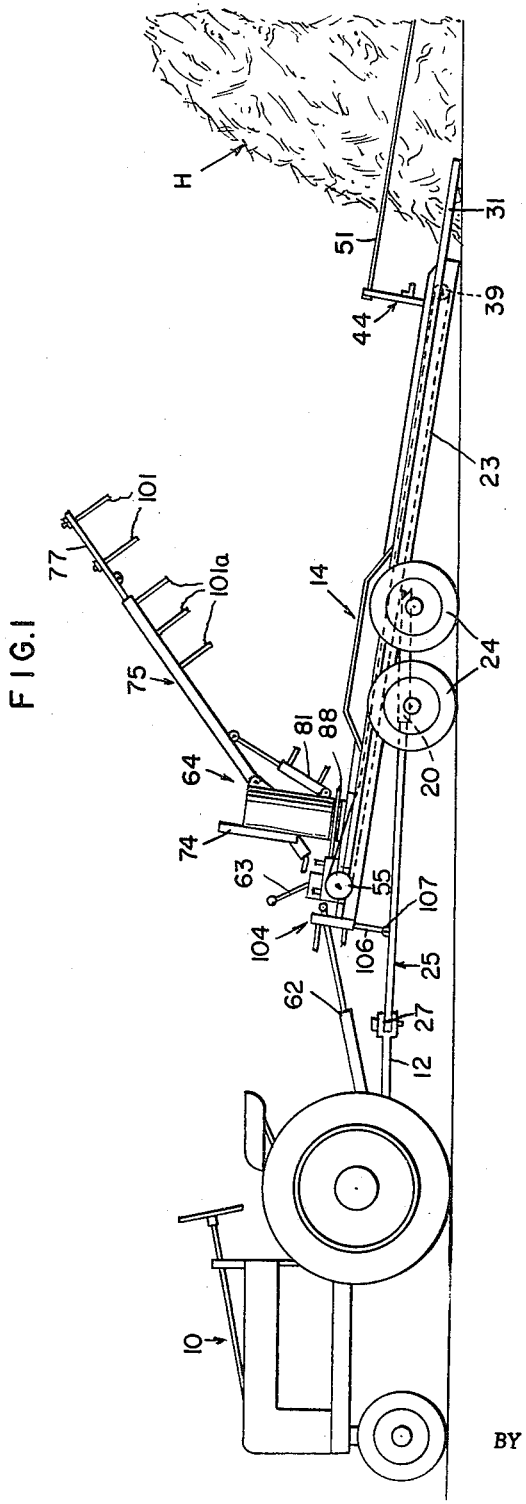
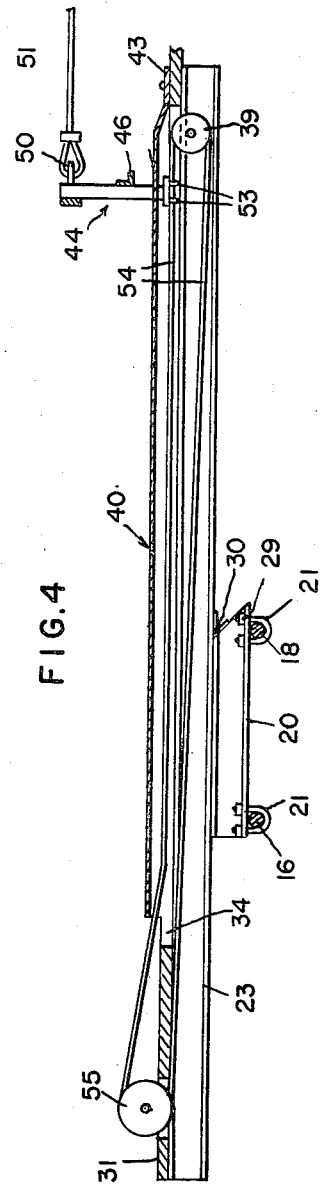
INVENTOR
Floyd O. Worden
BY Shoemaker & Mattare
ATTORNEYS April 26, 1960          F. O. WORDEN          2,934,229

SLED MOUNTED DISTRIBUTOR FOR HAY, STRAW AND THE LIKE

Filed March 31, 1958          4 Sheets-Sheet 2

INVENTOR
Floyd O. Worden

BY Shoemaker & Mattare

ATTORNEYS

April 26, 1960 F. O. WORDEN 2,934,229
SLED MOUNTED DISTRIBUTOR FOR HAY, STRAW AND THE LIKE
Filed March 31, 1958 4 Sheets-Sheet 3

INVENTOR
Floyd O. Worden

BY Shoemaker & Mattare

ATTORNEYS

April 26, 1960    F. O. WORDEN    2,934,229
SLED MOUNTED DISTRIBUTOR FOR HAY, STRAW AND THE LIKE
Filed March 31, 1958    4 Sheets-Sheet 4
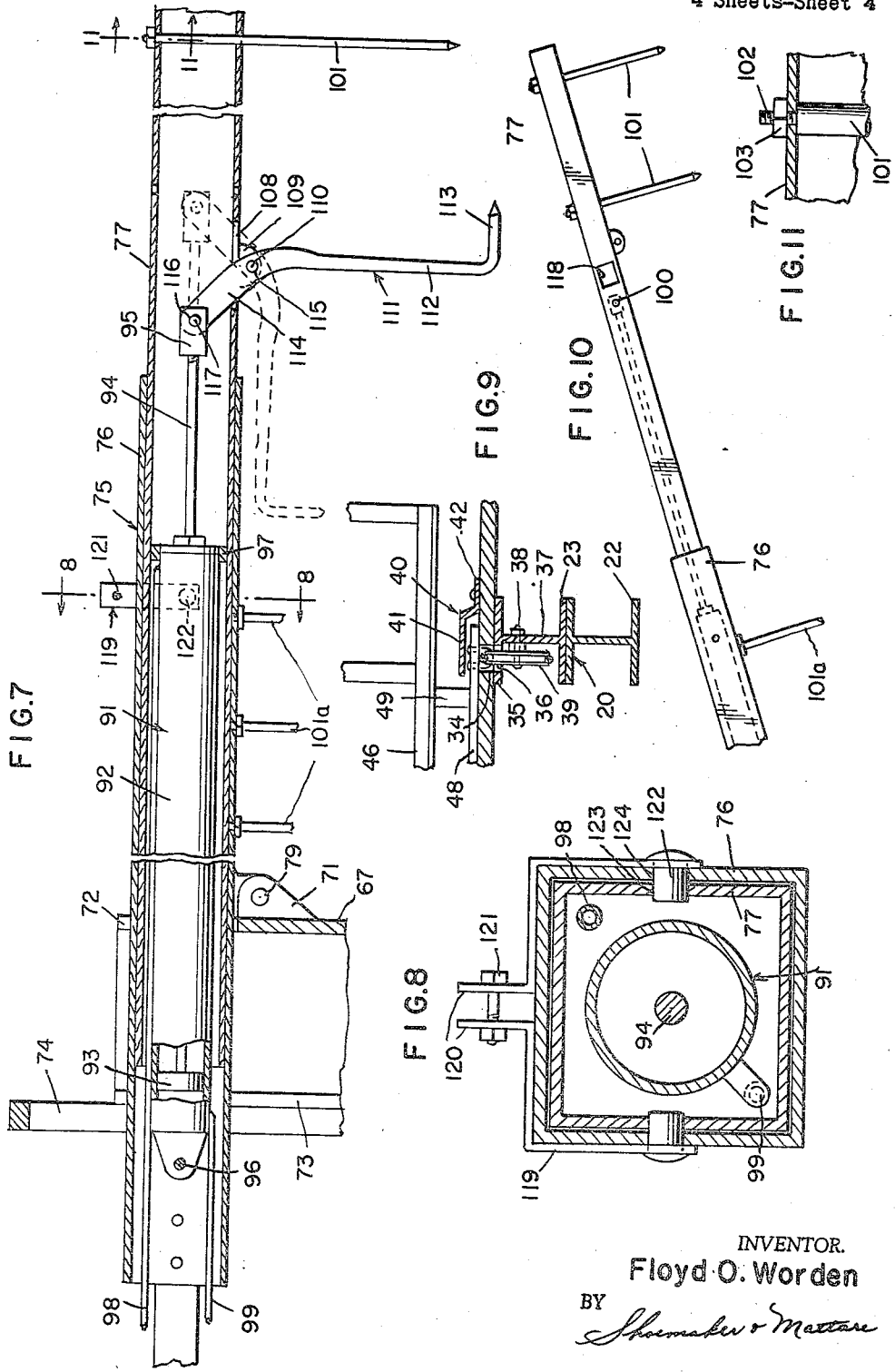
INVENTOR.
Floyd O. Worden
BY
Shoemaker & Mattare
ATTYS

United States Patent Office 2,934,229
Patented Apr. 26, 1960

1

2,934,229

SLED MOUNTED DISTRIBUTOR FOR HAY, STRAW AND THE LIKE

Floyd O. Worden, Grand Island, Nebr.

Application March 31, 1958, Serial No. 725,317

17 Claims. (Cl. 214—505)

This invention relates to wheeled farm equipment designed for distributing hay and straw over a field for use as food by domestic and wild animals.

The practice of distributing hay and straw over fields for use as food by animals is widely carried out and the procedure commonly followed is to manually throw or toss the material from trucks by pitchforks. Obviously it is necessary to use, in a majority of cases, manual labor to load the hay or straw onto the truck as well as to throw it off or scatter it, and this is not only time consuming but requires the use of a number of men and is heavy, tiring labor.

The particular object of the present invention, accordingly, in view of the foregoing, is to provide an improved wheeled apparatus which can be drawn over a field by tractor or other suitable means, which is equipped with power operated mechanism for effecting the distribution of straw over the field on both sides of the apparatus, from a stack carried on the apparatus.

Another object of the invention is to provide a wheel supported platform or wheeled sled which is equipped with a power actuated means for raking off straw or hay from a stack on the sled and also which is equipped with means, power operated, for effecting the placement of a stack of hay or straw on the sled platform.

Still another object of the invention is to provide a wheeled platform or sled equipped, as above described, which is mounted in a novel manner on its supporting wheels or ground engaging carrying means, whereby the back end of the platform can be lowered to the surface of the ground to facilitate the placing of a stack or pile of hay or straw thereon.

Still another object of the invention is to provide equipment of the above described character carrying a power operated means for grappling a stack of hay or straw and sliding or skidding the entire stack onto the platform over the rear end thereof when the latter is lowered to the surface of the ground.

A still further object of the invention is to provide in association with the pivotally mounted sled adapted to have its rear end lowered to the ground in the manner stated, a winch actuated cable pull means which can be engaged around a stack of hay or straw and operated to slide the stack onto the platform to a convenient position adjacent to a sweep rake boom operable for raking off portions of the stack during the progress of the apparatus over a field.

A still further object of the invention is to provide in a structure of the above character a novel sweep rake or sweep fork boom structure mounted upon the hay stack carrying platform with means for swinging it up and down or vertically and also for swinging it transversely or across the platform and which boom structure is also designed so that it can be extended or retracted to facilitate the complete raking or distribution of a stack of hay or straw from the platform.

Still another object of the invention is to provide a novel sweep form boom structure having raking teeth and also constructed so that it can be converted to a gripping means employing a claw operable in cooperation with a tooth for use as a bale lifting mechanism whereby baled hay can be lifted from the field and placed on the platform or in a truck.

Other objects and advantages of the present invention will become apparent as the description of the same proceeds, and the invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view in side elevation of apparatus constructed in accordance with the preferred embodiment of the present invention showing the same attached to a draft vehicle such as a tractor and also illustrating the platform in lowered position and the pulling mechanism connected with a stack of hay or straw preparatory to sliding the latter onto the platform;

Fig. 4 is a longitudinal section taken substantially on the line 4—4 of Fig. 2;

Fig. 7 is a longitudinal section on an enlarged scale and taken in a vertical plane through the sweep boom fork structure showing the actuating ram in side elevation therein and showing the outer section modified for use as a bale pick-up means by the substitution of a pivoted claw for one of the fork tines;

Fig. 8 is a section taken transversely of the boom approximately on the line 8—8 of Fig. 7, the section being on an enlarged scale and illustrating the locking means for securing the outer section of the boom against movement when the bale grappling claw is employed;

Fig. 9 is a detail section taken approximately on the line 9—9 of Fig. 2 looking toward the shiftable barrier to which the stack pulling cable is attached;

Fig. 10 is a side elevational view of the outer end of the sweep boom showing the outer portion thereof equipped with the tines for raking the hay from the stack;

Fig. 11 is a detail sectional view on an enlarged scale taken approximately on the line 11—11 of Fig. 7.

Referring now more particularly to the drawings, there is illustrated in Fig. 1, in the conventional manner, a tractor which is generally designated 10 and which, for the operation of the apparatus of the present invention, would be of the type having a rear power take-off together with a rear hitch, which is designated 12, and a suitable mechanism for delivering fluid pressure to desired piston cylinders. The fluid pressure delivering mechanism and power take-off are not illustrated as these are conventional elements or structures upon many types of tractors.

The sled mounted hay and straw distributor structure or apparatus of the present invention is generally designated 14 and in Fig. 1 is shown operatively connected with the rear end hitch 12 of a tractor such as that illustrated and described.

Figure 3:
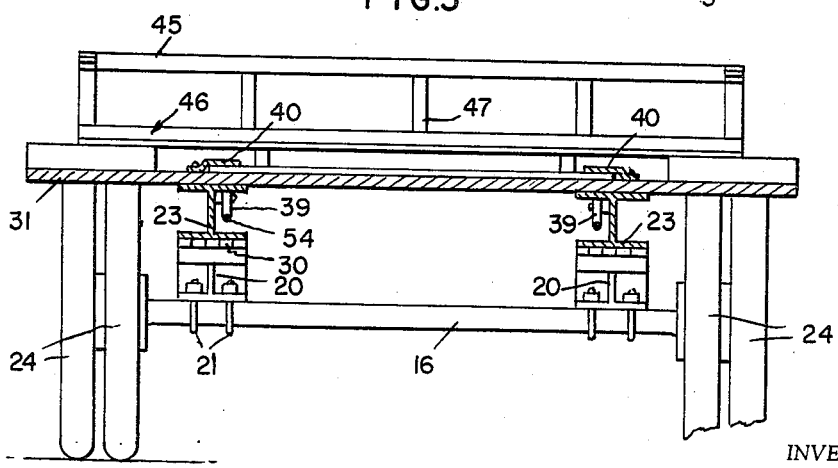
Fig. 3 is a transverse section taken substantially on the line 3—3 of Fig. 2.
Figure 5:
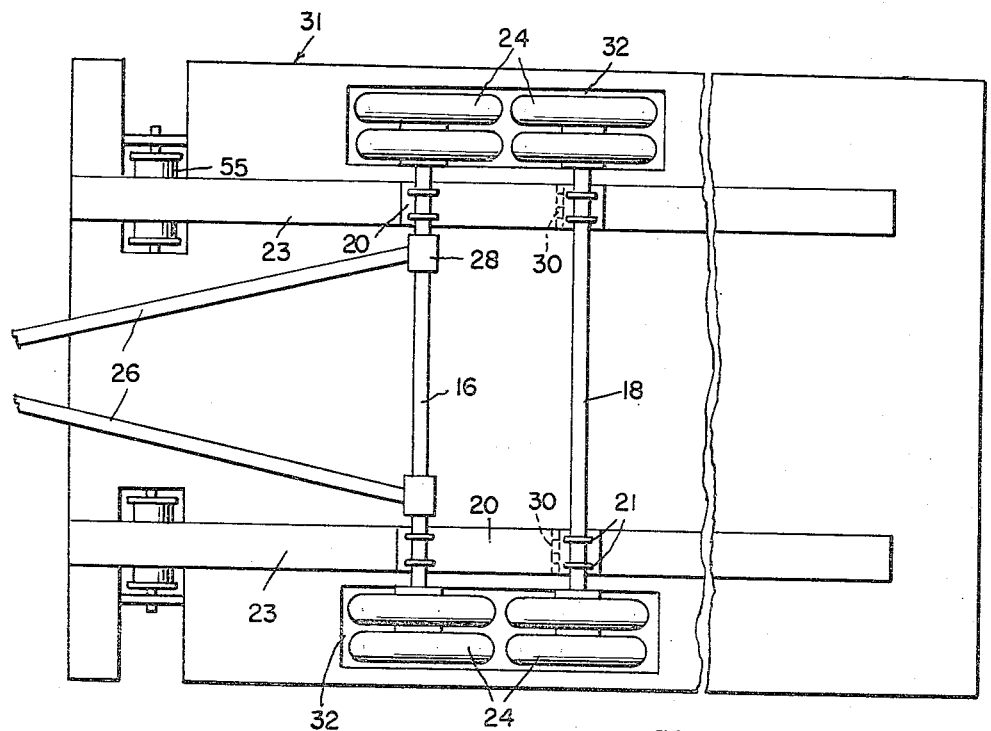
Fig. 5 is a bottom plan view of the apparatus with a mid portion thereof broken out.

The apparatus 14 embodies a platform supporting running gear which is shown in bottom plan in Fig. 5 and which comprises preferably a pair of axles 16 and 18 disposed in spaced parallel relation and connected by short bolsters 20 in the form preferably of I-beams as shown most clearly in Figs. 3 and 9. The bolsters rest upon and extend transversely of the axles 16 and 18 and are secured to the latter in a suitable manner as, for example, by the use of U-bolts 21 which encircle the axles and have their threaded end portions or shanks extended upwardly through the lower horizontal flanges 22 of the bolster beams 20, to receive upon their upper ends the usual nuts which are drawn up tight against the top surfaces of the flanges 22.

The bolster beams lying transversely of the axles 16 and 18, of course, extend longitudinally of the apparatus and each has lying upon the top thereof and in parallel relation therewith the beams 23 which support the hereinafter described platform and which, of course, also extend longitudinally of the apparatus.

The running gear also includes suitable dual wheels 24 rotatably mounted upon the outer ends of each of the axles and which wheels may be of any desired type but preferably embody conventional pneumatic tires.

While in the illustration of the invention pneumatic tired wheels are illustrated, it will, of course, be apparent that wheels having solid tires may be employed if desired, or runners or skids may also be used in place of the wheels, particularly if the apparatus is to be run over snow covered fields or other snow covered areas.

The axle 16 is the forward axle of the apparatus and it has connected therewith a draft tongue 25 for attachment to the hitch 12. This tongue also may be of any suitable type but is here shown as comprising two forwardly converging arms 26 which at their joined forward ends have a suitable head 27 to facilitate connection with the hitch 12 while at their rear ends each carries a bearing sleeve 28 through which the axle 16 passes. The spread of the arms 26 at the rear end of the hitch approximates the width of the space between the platform beams 23 as shown in Fig. 5.

The rear ends of the bolster beams 20 are cut on a slope or at a downwardly and rearwardly extending angle as shown in Fig. 4 at 29. Each of the platform beams 23 is hingedly joined to the back end of the underlying bolster beam 20 as indicated at 30, so that the beams 23 and the platform supported thereby may be tipped or swung down to lower the rear ends to the ground.

The beams 23 support the elongate platform which is generally designated 31 and which extends from the forward ends of the beams 23 to a short distance beyond the rear ends thereof and, of course, the platform is rigidly fixed to the beams 23 which are preferably of the I-beam type. The bottom flanges of these platform supporting I-beams rest firmly upon the top flanges of the bolster beams 20 when the platform is in level or horizontal position as shown in Fig. 4, while the platform 31 rests firmly upon the top flanges of the I-beams 23 and is rigidly secured thereto in a suitable manner as by means of bolts or the like, or if the platform is of metal, it may be welded directly to the supporting beams 23.

When the platform 31 is in normal horizontal position, the tops of the wheels 24 project a substantial distance above the top of the platform and accordingly to permit this the platform is provided with suitable openings as shown at 32 and over the tops of the wheels there are placed the fenders 33 which rest upon and are secured in a suitable manner to the surface of the platform. These fenders are in the form of an elongate or flat arch and permit the stack or mass of hay, hereinafter more particularly referred to, to be slid forwardly on and over the surface of the platform, preventing any of the hay from falling through or becoming entangled with the wheels.

The platform 31 has formed therein two longitudinally extending cable slots 34 each of which lies directly above the inner side of the top flange 35 of a beam 23. This flange 35 of each beam also has formed therein the longitudinal slot 36.

The vertical web portion 37 of each beam 23 supports a short pivot pin 38 which is directed inwardly toward the longitudinal center of the platform and which supports on its inner end a cable pulley or sheave 39 at a height or elevation where the top of the sheave is approximately in the plane of the top surface of the platform or slightly below the same.

Secured to the top surface of the platform 31 along the outer side of each of the longitudinal slots 34 is an elongate shield which is generally designated 40. Each of these shields embodies a top portion 41 of substantial width which completely covers the slot 34 and an attaching flange portion 42 which is offset as shown in Fig. 9 so that when it is secured to the platform as shown in this figure, the wider top portion will be slightly elevated from the top surface of the platform. The edge of the top portion 41 of each shield opposite from the offset flange 42, is free of connection with the platform and the shields thus open inwardly or toward one another and function as guides for a portion of the hereinafter described fence, as well as shields or covers for the fence operating cables.

At the rear ends of the platform slots 34 the shields have the top portions thereof sloped downwardly to join the surface of the platform as indicated at 43 in Fig. 4 whereby to facilitate the sliding of the hay stack onto the platform by the hereinafter described apparatus.

Figure 2:
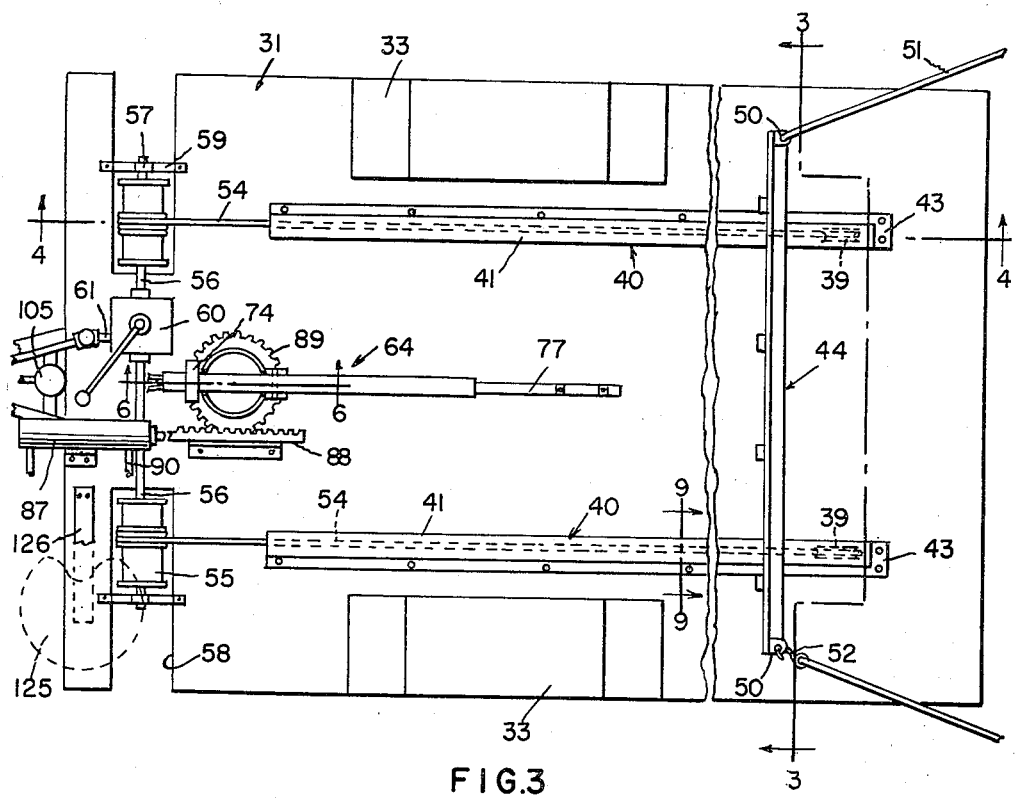
Fig. 2 is a view in top plan of the apparatus with a middle portion shown broken out.

The numeral 44 generally designates a fence or barrier which stands upright upon the top of the platform and extends transversely of the latter as shown in Fig. 2. This fence embodies top and bottom transversely extending rails 45 and 46 respectively, connected by uprights 47 and beneath the bottom rail 46 is positioned in parallel relation with the bottom rail the slide plate 48 the outer ends of which extend under the top portions 41 of the shields 40, as shown in Fig. 8, so that the shields function as guides for the ends of the plate. The fence is supported above the shields by the short upright posts 49 which are secured to the plate 48 and the bottom rail 46 of the fence.

Each end of the fence has secured to the rearward side thereof and at the top a rearwardly extending eye or ring 50. One of these eyes has fixedly attached thereto an end of a cable 51 while the opposite end of the cable is provided with a suitable hook 52 for connection in the opposite eye 50 when the cable is employed for pulling a stack or pile of hay onto the platform in the manner hereinafter described.

The plate 48 has secured thereto at each platform slot 34 an eye member or pair of eyes 53, or any other suitable means, for the attachment thereto of the two ends of a pull cable 54. This cable passes from the plate rearwardly over the adjacent sheave 39 and then extends forwardly along the underside of the I-beam flange 35 to and is turned several times around a drum 55 and from the drum then passes back into the slot 34 and along the same under the upper portion of the adjacent shield 40 to the attaching means 53 of the fence slide plate.

The drums 55 with which the fence operating or pull cables are connected are supported in axial alignment transversely of the forward end of the platform by shafts 56, the outer ends of which shafts are mounted in a suitable bearing 57, as shown in Fig. 2.

For the connection of the lower runs of the cables 54 with their respective drums 55, the platform is cut out from either side or has provided therein the recesses 58 and in the arrangement illustrated, the bearings 57 for the outer ends of the drum supporting shafts are carried by suitable bridge means 59 which extends across the adjacent recess 58.

It will be apperciated that other suitable means may be employed for rotatably supporting the outer ends of the drum carrying shafts 56 and accordingly the invention is not necessarily limited to the specific arrangement here illustrated.

The two shafts 56 carrying the drums 55 extend at their inner ends into a gear housing 60 enclosing suitable mechanism by means of which the shafts 56 may be coupled with or uncoupled from a driving shaft 61 which is designed to have attached to it an end of a conventional power transmitting shaft 62 having its other end operatively coupled with the power take-off, not shown, of the tractor 10. No details of the gear mechanism in the housing 60 is illustrated since such mechanism may be of any suitable or conventional construction adapted to be controlled by a hand lever 63 for starting and stopping the rotation of the drums 55. It will be readily apparent that when the drums 55 are rotated, synchronously in one direction, the upper runs of the cables 34 will be wound up on the drums and the fence 44 will be pulled toward the front end of the platform and when the drums are reversed, the lower runs of the cables will be wound up thereon and the fence 44 will be moved toward the rear end of the platform.

As illustrated in Figs. 1 and 2, the cable drums and gear mechanism 60 are disposed across the forward end of the platform.

At the longitudinal center of the platform adjacent to and rearwardly of the gear 60 and cable drum shafts 56, there is mounted the boom sweep fork and supporting and operating means therefor all of which is generally designated 64.

Figure 6:
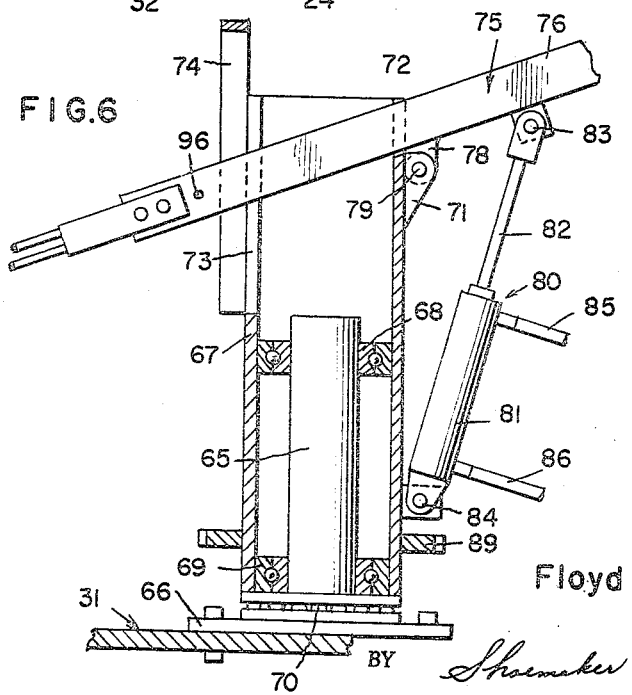
Fig. 6 is a vertical section on an enlarged scale through the boom supporting rotary standard, the section being approximately on the line 6—6 of Fig. 2 with the rear end portion of the boom and the elevating hydraulic cylinder shown in side elevation.

The structure 64 comprises a fixed upright post 65 which is secured by means of a base plate 66 or in any other suitable manner to the platform 31, as shown in Fig. 6. Mounted concentrically with the post 65 is the tubular standard 67 between the interior of which and the post 65 are interposed upper and lower ring bearings 68 which maintain the standard 67 centered for rotation around the post 65.

To facilitate the easy turning of the standard around the post, a step bearing 70 may be interposed between the bottom end of the standard and the post base plate 66, as shown.

Secured to the outer side of the wall of the standard 67 adjacent the top thereof is a hinge ear 71 and immediately above this ear the wall of the standard is slotted as indicated at 72 while diametrically opposite from the slot 72 the standard wall has a second and longer slot therein as indicated at 73 and overlying this slot and secured to the wall of the standard is a yoke 74. The top of the yoke is disposed above the top of the standard and, of course, spans the slot, as shown in Fig. 2.

The numeral 75 generally designates the boom which embodies an inner tubular section 76 of polygonal cross section, and an outer tubular section 77 which is also of polygonal cross section and is fitted at its inner end for sliding movement in the inner section as illustrated most clearly in Fig. 7. The forward or outer section 77 is intended to be reciprocated as necessary in the inner or rearward section 76 for elongating or shortening the boom as may be desired, and the two sections of the boom are maintained against relative turning by forming the same of polygonal cross section, as stated, the sections here being shown as of square cross sectional form.

The rear end of the outer or rearward section 76 of the boom extends diametrically across the top end of the standard 67 and lies in the slots 72 and 73 as shown in Fig. 6, and a fixed hinge ear 78 carried by the section 76 is pivotally coupled, as at 79, to the ear 71 so that the boom can be rocked on a horizontal axis for the raising and lowering of the outer end thereof. The rais- ing and lowering of the boom is effected by a hydraulic motor which is generally designated 80 and which is here shown as embodying a fluid cylinder 81 housing a piston, not shown, from which extends the piston rod 82 which is pivotally coupled at its outer end with the underside of the rear section 76 of the boom, as indicated at 83.

The end of the cylinder 81 opposite from the coupling 83 is pivotally mounted as indicated at 84 upon the wall of the rotary standard 67. The motor unit 80 extends upwardly and outwardly at an inclination with respect to the standard 67 for connection with the underside of the boom at a point forwardly of the pivot 79 so that when fluid power is introduced into the cylinder beneath the piston, the piston rod will be extended to elevate the boom in an obvious manner.

The cylinder 81 is shown as having the conduits 85 and 86 connected with the upper and lower ends respectively thereof, and these are connected through suitable control valves, not shown, with the hydraulic power unit, not shown, of the tractor 10.

Transverse sweeping motion of the boom is effected by turning the standard 67 around the fixed post 65 and this turning and sweeping of the boom is also effected by hydraulic power delivered from the power source on the tractor to the piston cylinder 87 mounted upon the platform forwardly and to one side of the standard as shown in Fig. 2. The piston in the cylinder 87 transmits motion to the standard 67 through a reciprocating rack gear 88 which is in engagement with a spur gear 89 secured to the bottom portion of and encircling the standard 67.

Fluid pressure is delivered to the cylinder 87 from the hydraulic power unit of the tractor by way of the conduits 90, it being understood, of course, that these conduits will have suitable manually operated valves by which the attendant of the structure may control the inflow and outflow of the fluid to the piston cylinder for effecting the reciprocation of the rack gear 88.

Elongation and shortening of the boom by the extension and retraction of the outer portion 77 is effected by means of a hydraulic ram motor housed within the rear end portion of the rear section 76 as shown in Fig. 7, which hydraulic ram motor is generally designated 91. The motor 91 comprises a cylinder 92 housing the piston 93 with which is connected the piston rod 94 which extends from the forward end of the cylinder as illustrated, and carries on its forward end the head 95.

The rear end of the cylinder 92 is secured by suitable means such as the cross pin 96 to the boom section 76 and the forward end of the cylinder extends into the rear end of the hollow or tubular forward section 77 of the boom and is encircled by a guide or positioning collar 97 which engages the wall of the forward section 77, this section, of course, sliding on or across the collar in its inward and outward movements, as will be obvious.

The forward and rear ends of the cylinder 92 have connected therewith the fluid conducting pipes 98 and 99 respectively through which fluid under pressure is delivered as required from the hydraulic unit of the tractor through suitable control valves to effect the inward and outward movements of the piston 93 and rod 94.

In the use of the boom sweep as a rake for scattering hay or straw from the platform, the piston rod head 95 is coupled by means of a suitable pin coupling 100 with the forward boom section 77, the pin extending transversely through the section and being readily removable when necessary for the operative connection of the piston rod head 95 with the hereinafter described claw member.

The forward or outer end of the boom section 77 has secured thereto a number of downwardly directed tines 101 which are readily removable for repair or replacement, one manner of attaching the tines to facilitate such removal being illustrated in Fig. 11 where the upper end of the tine is shown as having a reduced threaded axial pin 102 which extends through an opening in the top side of the boom section 77 to receive the securing nut 103.

In the operation of the distributor, the draft tongue 25 is, of course, first coupled as illustrated in Fig. 1 with the draft hitch 12 of the tractor and suitable connections are made between the fluid pistons 81, 87 and 92 and the hydraulic power unit of the tractor, and also the necessary coupling is established by means of the shaft 62 between the tractor power take-off and the gear mechanism 60.

The wheel supported platform is then maneuvered into position where the back end will be disposed adjacent to a stack or pile of hay such as that designated H in Fig. 1, and the platform is then oscillated on the hinges 30 to lower the back end of the platform to the surface of the ground.

Any suitable means may be employed for oscillating the platform or tilting it to the position shown in Fig. 1, such, for example, as a hydraulic unit, here designated 104, and embodying a cylinder 105 secured vertically to the forward end of the platform and a piston actuated rod 106 directed downwardly for attachment as at 107 to the underlying tongue 25. By this means the heavy forward end of the platform can be moved upwardly to tilt the platform in the manner shown.

After positioning the platform as shown, the cable 51 is then carried around the hay stack and the free end brought forwardly and attached as at 52. The stack will then be encircled by the cable 51 and upon operation of the cable drums 55 in the proper direction the fence 44 together with the cable and the stack of hay encircled thereby will be moved forwardly, thus sliding the hay stack onto the platform to a position beneath the elevated forked rear end of the boom.

The platform will then be swung down to a horizontal position and while the stack is being transported over the field the boom fork can be lowered and swung from side to side or swept across the top of the hay stack so as to throw off desired quantities of the hay to opposite sides of the apparatus. This operation of the boom is, of course, under the control of manual valves operated by an attendant on the platform to effect the introduction of fluid at the proper ends of the cylinders 81 and 87.

Necessary changing of the length of the boom is accomplished by controlling the inflow and outflow of fluid into and from the ram cylinder 92.

Provision is made whereby the boom may also be employed for picking up bales of hay from the ground and deposit on the platform or removing bales from the platform, as may be desired, by substituting for one of the tines 101 a pointed hook or claw as illustrated in Fig. 7.

For the stated substitution of the desired claw for use in association with one of the tines 101, the underside of the outer portion 77 of the boom is provided with the slot 108 which is flanked by a pair of spaced ears 109 transversely apertured to receive a pivot pin 110.

The claw member employed in association with the tine 101 is generally designated 111. This member comprises a long shank body 112 having a portion on one end turned to form the pointed tine 113. At the opopsite end of the shank there is formed the obliquely extending leg 144 which projects from the side of the shank opposite from the side from which the tine 113 projects and this leg is provided at the angle between the same and the shank with the pivot pin aperture 115 and the other or outer end of the leg is also apertured as indicated at 116.

To mount the claw in operative position, the pin 100 which couples the head 95 with the outer portion of the boom is removed and the end of the leg 114 is inserted into the slot 108 and the head of the piston rod is advanced until it is in position to align with the opening 116 and a pin may then be inserted as indicated at 117 through the hole of the leg and the hole in the piston rod head previously occupied by the pin 100. To facilitate this connection of the pin 117, the side of the boom portion 77 may be provided with a suitable hand hole or opening 118 through which the head 95 and the inner end of the leg can be reached.

The portion of the leg 114 having the hole 115 therein will then be in position between the ears 109 to receive the pivot pin 110.

In this use of the claw the two portions 76 and 77 of the boom will be coupled or locked together so that there can be no relative movement and for this a locking means of the character shown in Fig. 8 has been found satisfactory. This locking means comprises two angled arms 119 each adapted to engage over a part of the top and one side of the boom portion 77. These are disposed on opposite sides of the boom outer portion and each of the arms has an outwardly extending terminous 120 and these are brought into adjacent opposed relation as shown and coupled together by a cross bolt 121. The opposite ends of the arms 119 carry the lugs 122 and these are inserted into the aligned openings 123 and 124 formed respectively through the inner and outer portions of the boom, thus locking the two portions against relative movement.

With the arrangement thus described, it will be seen that when the piston rod 94 of the hydraulic ram 91 is moved in and out, the claw 111 will be rocked so as to move the pointed end of the tine 113 toward and away from the fixed boom tine 101 and thus an object such as a bale of hay may be gripped between the claw and the boom tine in an obvious manner to be lifted to any desired position either onto the platform or from the platform onto the ground.

From the foregoing it will be seen that there is provided by the present invention a new and novel sled mounted distributor mechanism which is equipped with means for placing without manual effort a stack of hay on the platform from which the hay can be distributed in desired amounts and at a desired rate by means of the power actuated boom sweep fork.

In referring to the distributor as "sled mounted," it is to be understood that this term embraces the use of both wheels or ground engaging runners for supporting the platform.

To facilitate the operation of the various power units on the platform, the latter may have mounted thereon in a convenient location a seat structure of the type commonly used upon tractors or other agricultural machinery and in Fig. 2 such a seat structure is shown in broken lines and designated 125, a portion of a suitable supporting arm for the seat structure being shown and designated 126.

In addition to providing the tines 101 upon the extensible portion 77 of the boom, other tines may be secured to the inner portion 76 adjacent to the outer end thereof, which will facilitate the raking of hay from locations close to the platform. These tines, which are designated 101a, will be permanently fixed to the inner portion of the boom and will not interfere with the operation of the mechanism for the handling of bales of material by the use of fork 111 provided for cooperation with the tine 101 adjacent thereto.

I claim:

1. Apparatus for distributing hay, straw and like material comprising in operative combination a platform, means supporting the platform for movement over the ground, a sweep boom fork having an outer end carrying tines and mounted adjacent to its inner end upon the platform for elevating, lowering and transversely sweeping movement of the outer end over the platform for distributing laterally from the platform hay, straw and like material stacked thereon, means for elevating and lowering the boom and means for effecting sweeping movement of the same across the platform.

2. The invention according to claim 1, wherein said boom is extensible.

3. The invention according to claim 1, with a claw member pivoted to the boom adjacent to a tine to swing relative to the tine for coaction with the tine as a body pick-up means, and power means operatively connected with said claw member for actuating the latter relative to the said tine.

4. The invention according to claim 1, with means for lowering an edge of the platform to the ground, and means for transferring a stack of material from the ground onto the platform across the lowered edge thereof.

5. Apparatus for distributing hay, straw and like material comprising in operative combination a sled structure adapted to have said material placed thereon, a standard mounted on and adjacent to an end of the structure for turning on a substantially vertical axis, a boom having an inner end pivotally mounted on the standard for vertical swinging, means for effecting said swinging of the boom, means for turning the standard to sweep the boom across the sled structure, and at least two elongate members attached to the boom at the outer end thereof and extending downwardly therefrom at right angles thereto for cooperative operation upon material on the sled.

6. The invention according to claim 5, wherein said elongate members comprise tines secured rigidly to the boom.

7. The invention according to claim 5, wherein one of said members comprises a tine and the other member comprises an elongate claw having one end pivoted to the boom for swinging movement of its other end relative to said tine, said other end of the claw having a pointed extension directed toward the tine, and means coupled with said one end of the claw for effecting said swinging movement.

8. The invention according to claim 5, wherein said sled embodies a platform and underlying running gear, means pivotally coupling the platform with the running gear for turning on a horizontal transverse axis whereby the rear end of the platform may be lowered to the ground, and power operated means for transferring a quantity of material from the ground onto the platform across the said lower end thereof.

9. The invention according to claim 8, wherein said power means comprises a structure supported on the platform for back and forth movement between the forward and rear ends thereof, power mechanism on the platform coupled with said structure for moving the latter and means for attaching to the said platform supported structure the said quantity of material to effect the said transferring of the material by and upon forward movement of the structure.

10. The invention according to claim 8, wherein said power operated means comprises a fence disposed upon and across the platform for back and forth movement between the forward and rear ends thereof, an endless cable extending longitudinally of the platform at each end of the fence and passing around an idler pulley at the rear end of the platform and around a power driven drum at the forward end of the platform, each cable having a top flight attached to the adjacent end of the fence and power mechanism operatively connected with said drums.

11. The invention according to claim 10, wherein the platform has a longitudinal slot for and in which the top flight of each endless cable passes from the idler pulley therefor forwardly and upwardly to the top side of the platform and to its power driven drum, and a shield body extending longitudinally of and overlying each slot.

12. The invention according to claim 11, wherein said shield bodies are open along their adjacent sides and said fence includes a slide plate lying transversely of the platform between said shields having its ends engaged beneath the shields through said open sides thereof, whereby the cable and slot covering shields additionally function as guides for the fence slide plate.

13. Apparatus for distributing hay, straw and like material, comprising in operative combination a sled platform, ground engaging gear supporting the platform for travel, said gear including a draft tongue for coupling the apparatus to a draft vehicle, a standard supported on the platform for rotation on a vertical axis, a boom comprising inner and outer elongate portions telescopically connected for elongating and shortening the boom, said inner portion being mounted adjacent to its inner end on said standard for turning about a substantially horizontal axis, tines secured to the outer end of said outer portion and extending downwardly at substantially right angles therefrom toward the platform, power means for effecting extension and retraction of the boom outer portion relative to the inner portion, power means connected between the boom inner portion and the standard for turning the boom on said horizontal axis, and power means on the platform operatively coupled with said standard for turning the standard and the supported boom on said vertical axis.

14. The invention according to claim 13, wherein said inner and outer boom portions are tubular and the inner end of the outer portion extends into and snugly fits in the inner portions, means for maintaining the outer portion against axial turning in the inner portion, and said power means for effecting extension and retraction of the boom outer portion comprising a hydraulic ram housed and secured in said inner portion and extending into the outer portion and including a reciprocable piston rod extending into and coupled to said outer portion and means for delivering pressurized fluid to the ram.

15. The invention according to claim 14, with an elongate claw member, means for pivotally attaching the claw member inwardly of one end of the boom outer portion for swinging movement relative to an adjacent tine, means for extending the said one end of the claw member to the interior of the boom outer portion, means for transferring the coupling of said piston rod from the boom outer portion to the said one end of the claw member, and means for locking the boom portions against relative movement whereby reciprocation of the ram piston rod will effect only swinging of the claw member, the claw member when so swung cooperating with the adjacent tine to grapple and lift a body.

16. Apparatus of the character described comprising a supporting structure adapted to carry a stack of hay, straw and the like, a standard on said structure, a hollow sectional longitudinally extensible boom, an inner end section of the boom being pivotally mounted upon the standard for the vertical swinging of the boom, the standard being rotatable on its longitudinal axis for sweeping the outer end of the boom across the width of the structure, at least two tines secured to the terminal outer end section of the boom and projecting downwardly therefrom, power means housed in the said inner end section and including an outwardly directed headed reciprocable rod, means effecting the operation of said power means for extending and retracting said rod, an elongate claw member, means for detachably pivotally coupling the claw member to the terminal section of the boom for operative swinging movement of the claw relative to an adjacent tine, means for securing the boom sections against relative longitudinal movement, and means for selectively coupling said headed end of the rod with the terminal section and with the claw member whereby when the means for securing the boom sections is effective the claw member only may be actuated for coaction with the adjacent tine and whereby when the last stated means is not effective the boom sections may be longitudinally relatively moved.

17. The invention according to claim 16, wherein the said selective coupling means embodies a leg forming a part of the claw member and extending to the interior of said terminal section through an opening in the wall of the latter section and a coupling pin adapted for extension through openings in and transversely of the terminal section and through the head when the boom is to be extended and retracted and another coupling pin adapted upon removal of the first pin to be extended through an opening in the leg part and through the head.

References Cited in the file of this patent

UNITED STATES PATENTS

| | | | |
|---|---|---|---|
| 2,599,991 | Hegre | June 10, 1952 |
| 2,620,935 | Christiansen | Dec. 9, 1952 |
| 2,711,259 | Jones | June 21, 1955 |
| 2,712,878 | Sutton | July 12, 1955 |
| 2,746,612 | Wirz | May 22, 1956 |
| 2,756,885 | Ackermann | July 31, 1956 |
| 2,761,577 | Lahman | Sept. 4, 1956 |
| 2,807,373 | Couser | Sept. 24, 1957 |
| 2,810,486 | Elton | Oct. 22, 1957 |